United States Patent
Lee et al.

(10) Patent No.: US 9,053,463 B2
(45) Date of Patent: Jun. 9, 2015

(54) APPARATUS AND METHOD FOR PUSHING E-MAIL TO PORTABLE TERMINAL IN E-MAIL SYSTEM

(75) Inventors: Chul-Hwan Lee, Seoul (KR); Youn-Taek Oh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 717 days.

(21) Appl. No.: 12/100,173

(22) Filed: Apr. 9, 2008

(65) Prior Publication Data
US 2008/0256206 A1 Oct. 16, 2008

(30) Foreign Application Priority Data
Apr. 10, 2007 (KR) ........................ 10-2007-0034890

(51) Int. Cl.
*G06F 15/16* (2006.01)
*G06Q 10/10* (2012.01)
*H04L 12/58* (2006.01)

(52) U.S. Cl.
CPC .............. *G06Q 10/107* (2013.01); *H04L 51/38* (2013.01); *H04L 51/14* (2013.01)

(58) Field of Classification Search
USPC .................................. 709/204–211, 217–219
See application file for complete search history.

(56) References Cited

U.S. PATENT DOCUMENTS

| | | | |
|---|---|---|---|
| 7,400,897 B2 * | 7/2008 | Lazaridis ...................... | 455/507 |
| 2003/0163534 A1 * | 8/2003 | Huang .......................... | 709/206 |
| 2004/0184613 A1 * | 9/2004 | Lai et al. ...................... | 380/249 |
| 2004/0192352 A1 * | 9/2004 | Vallstrom et al. ........... | 455/456.6 |
| 2005/0282531 A1 * | 12/2005 | Andreasson .................. | 455/418 |
| 2006/0143278 A1 * | 6/2006 | Bauchot et al. .............. | 709/206 |
| 2007/0021100 A1 * | 1/2007 | Haave et al. ................. | 455/404.2 |
| 2007/0106739 A1 * | 5/2007 | Clark et al. ................... | 709/206 |
| 2007/0112971 A1 * | 5/2007 | Noff et al. .................... | 709/231 |
| 2007/0115936 A1 * | 5/2007 | Newton ........................ | 370/352 |
| 2007/0299918 A1 * | 12/2007 | Roberts ........................ | 709/206 |
| 2008/0046510 A1 * | 2/2008 | Beauchamp et al. ......... | 709/204 |
| 2008/0046518 A1 * | 2/2008 | Tonnison et al. ............. | 709/206 |
| 2008/0161026 A1 * | 7/2008 | Wiatrowski et al. .......... | 455/466 |
| 2008/0172365 A1 * | 7/2008 | Ozden et al. ................. | 707/3 |
| 2008/0194276 A1 * | 8/2008 | Lin et al. ...................... | 455/466 |
| 2008/0244086 A1 * | 10/2008 | Patel ............................ | 709/238 |
| 2008/0256206 A1 * | 10/2008 | Lee et al. ..................... | 709/206 |

FOREIGN PATENT DOCUMENTS

| KR | 1020040011118 | 2/2004 |
|---|---|---|
| KR | 1020070030345 | 3/2007 |

* cited by examiner

*Primary Examiner* — Alicia Baturay
(74) *Attorney, Agent, or Firm* — The Farrell Law Firm, P.C.

(57) ABSTRACT

Provided is an apparatus and method for pushing an e-mail to a portable terminal in an e-mail system. In an e-mail system for pushing an e-mail, an e-mail agent checks reception of a new e-mail, receives and stores the new e-mail, and generates a mail notification message, a message server receives the mail notification message and transmits it to an e-mail client, the e-mail client generates a mail request message and transmits it to the e-mail agent.

34 Claims, 8 Drawing Sheets

FIG.1

(PRIOR ART)

APPARATUS AND METHOD FOR PUSHING E-MAIL TO PORTABLE TERMINAL IN E-MAIL SYSTEM

PRIORITY

This application claims priority under 35 U.S.C. §119(a) to an application filed in the Korean Intellectual Property Office on Apr. 10, 2007 and assigned Serial No. 2007-34890, the contents of which are incorporated herein by reference.

BACKGROUND OF THE INVENTION

1. Field of the Invention

The present invention relates generally to an apparatus and method for pushing an e-mail to a portable terminal in an e-mail system, and in particular, to an apparatus and method for notifying a portable terminal of reception of a new e-mail using a message server.

2. Description of the Related Art

Rapid development of portable terminals has allowed portable phones capable of wireless voice communication and information exchange to become necessities of the everyday life. Early portable terminals were known just for their portability and capability of wireless communications. However, as technologies for the portable terminal are developed and the wireless Internet is introduced, an application range of the portable terminal is continuously expanding, for example, from simple voice communication and schedule management to image capture using a mounted digital camera, a satellite broadcasting service, games, web surfing through the wireless Internet and an e-mail service.

In particular, modern people widely use the e-mail service for information transfer. Some users of portable terminals receive an e-mail using the portable terminals for checking the e-mail immediately. A conventional e-mail system for checking e-mail using a portable terminal will be described below.

Figure 1:
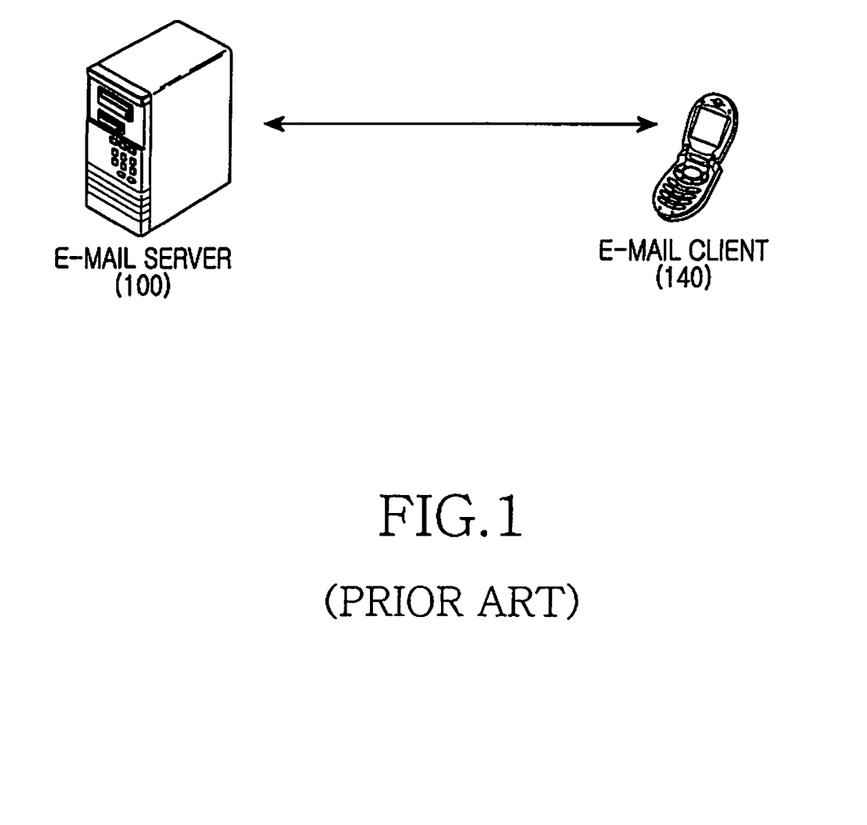
FIG. 1 is a diagram illustrating a conventional e-mail system for pushing an e-mail to a portable terminal.

FIG. 1 is a diagram illustrating a conventional e-mail system for pushing an e-mail to a portable terminal. Referring to FIG. 1, an e-mail client 140, e.g., a portable terminal, periodically performs a polling operation, which is performed to determine if an e-mail server 100 receives a new e-mail in the conventional e-mail system using a Simple Mail Transfer Protocol (SMTP), a Post Office Protocol version 3 (POP3), or an Internet Message Access Protocol version 4 (IMAP4). Then, when the e-mail server 100 receives a new e-mail, the e-mail client 140 receives the new e-mail.

However, in order to use the above-described e-mail service, after the e-mail client 140 is connected to the e-mail server 100 by using personal information, e.g., an e-mail account ID and password, the polling operation must be performed. That is, a user of the e-mail client 140 does not know if a new e-mail is received before the polling operation is performed, and frequent performance of the polling operation consumes the battery power of the e-mail client 140.

Figure 2:
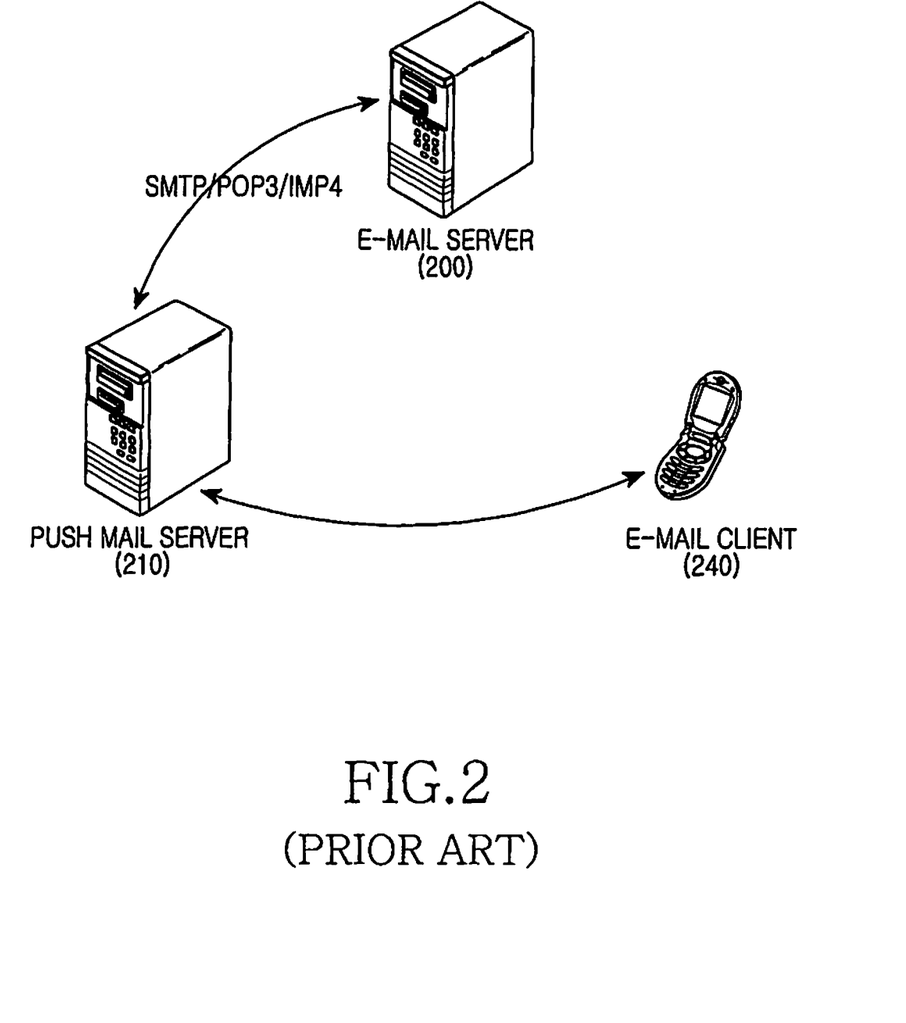
FIG. 2 is a diagram illustrating another conventional e-mail system for pushing an e-mail to a portable terminal.

FIG. 2 is a diagram illustrating another conventional e-mail system for pushing an e-mail to a portable terminal. Referring to FIG. 2, a push mail server 210 periodically determines if an e-mail server 200 receives a new e-mail using the SMTP, the POP3, or the IMAP4. When the e-mail server 200 receives a new e-mail, the push mail server 210 pushes the new e-mail to an e-mail client 240 that is connected to the push mail sever 210 whenever the e-mail server 200 receives a new e-mail.

However, in this case, the e-mail client 240, e.g., a portable terminal, must be continuously connected to the push mail sever 210 and the battery power of the e-mail client 240 is consumed significantly. Further, the e-mail client 240 cannot receive the new e-mail when the communication connection between the e-mail client 240 and the push mail server 210 is interrupted. In addition, in order to receive a new e-mail from the push mail server 210, additional expense is required.

SUMMARY OF THE INVENTION

An object of the present invention is to solve at least the above problems and/or disadvantages and to provide at least the advantages below. Accordingly, an object of the present invention is to provide an apparatus and method for pushing an e-mail to a portable terminal in an e-mail system.

Another object of the present invention is to provide an apparatus and method for notifying a portable terminal of reception of a new e-mail using a message server to allow the portable terminal to receive the new e-mail in an e-mail system.

Still another object of the present invention is to provide an e-mail system for checking existence of a new e-mail in an e-mail server using a personal computer and notifying a portable terminal of the existence of the new e-mail using a message server.

Even another object of the present invention is to provide a portable terminal for checking reception of a new e-mail through a message server and receiving the new e-mail.

According to one aspect of the present invention, an e-mail system for pushing an e-mail includes an e-mail agent for checking if a new e-mail exists in an e-mail server by using periodic polling operations, receiving and storing the new e-mail when the new e-mail exists in the e-mail server, generating a mail notification message notifying reception of the new e-mail, and transmitting the mail notification message to a message server; the message server for receiving the mail notification message and transmitting the received mail notification message to an e-mail client; and the e-mail client for generating a mail request message requesting the new e-mail upon reception of the mail notification message from the message server, and transmitting the generated mail request message to the e-mail agent.

According to another aspect of the present invention, an e-mail agent for pushing an e-mail through a message server in an e-mail system includes an e-mail storage for storing an e-mail from an e-mail server; a client database for storing information on an e-mail client; an e-mail processor for periodically checking if a new e-mail exists in the e-mail server, receiving the new e-mail when the new e-mail exists in the e-mail server, and storing the received new e-mail into the e-mail storage; and a message processor for generating a mail notification message indicating that a new e-mail exists when the e-mail processor receives the new e-mail, and transmitting the mail notification message to the message server.

According to still another aspect of the present invention, a portable terminal for checking reception of an e-mail using a message server in an e-mail system includes a message processor for receiving a mail notification message notifying of existence of a new e-mail from the message server; and an e-mail processor for performing communication connection with an e-mail agent transmitting the mail notification message when the message processor receives the mail notification message, and generating and transmitting a mail request message requesting the new e-mail to the e-mail agent.

According to even another aspect of the present invention, a method for pushing an e-mail using a message server in an e-mail agent of an e-mail system includes periodically checking if a new e-mail exists in an e-mail server, generating a mail notification message notifying existence of a new e-mail, and transmitting the mail notification message to the message server.

According to even still another aspect of the present invention, a method for recognizing existence of a new e-mail through a message server and receiving the new e-mail in a portable terminal of an e-mail system includes receiving a mail notification message notifying existence of a new e-mail from the message server; performing a communication connection with an e-mail agent transmitting the mail notification message; and generating and transmitting a mail request message requesting the new e-mail to the e-mail agent.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for notifying a portable terminal of reception of a new e-mail to allow the portable terminal to receive the new e-mail.

Figure 3:
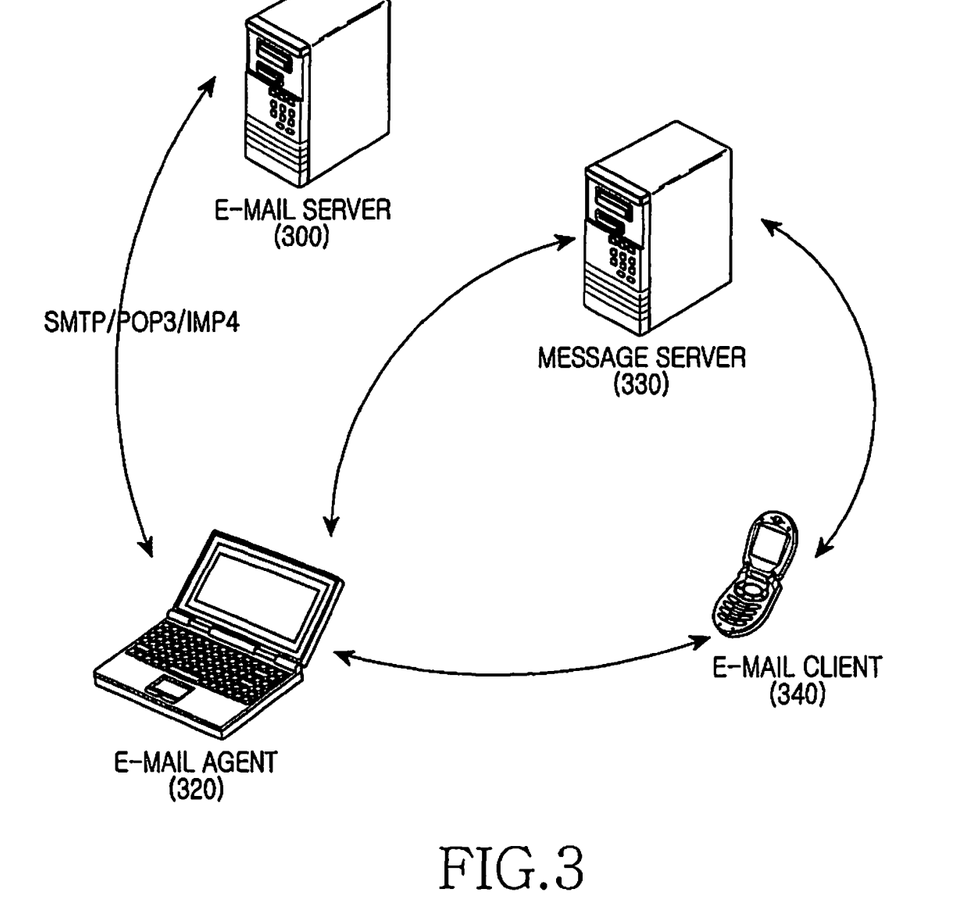
FIG. 3 is a diagram illustrating an e-mail system for notifying of reception of a new e-mail using a message server according to the present invention.

FIG. 3 is a diagram illustrating an e-mail system for notifying of reception of a new e-mail using a message server according to an embodiment of the present invention. Referring to FIG. 3, the e-mail system includes an e-mail server 300, an e-mail agent 320, a message server 330, and an e-mail client 340.

The e-mail server 300 is the same as a conventional e-mail server that provides basic conventional e-mail services, and provides e-mail accounts, receives, stores, and transmits e-mails to the e-mail agent 320.

The e-mail agent 320 determines if the e-mail server 300 receives a new e-mail by performing a polling operation using a Simple Mail Transfer Protocol (SMTP), a Post Office Protocol version 3 (POP3), or an Internet Message Access Protocol version 4 (IMAP4). When the e-mail server 300 receives a new e-mail, the e-mail agent 320 stores the new e-mail and notifies the e-mail client 340 of reception of the new e-mail using the message server 330. When the e-mail client 340 requests the e-mail agent 320 to send the new e-mail, the e-mail agent 320 transmits it to the e-mail client 340.

The e-mail agent 320 may be the same as the conventional push mail server 210 that is used by a plurality of users. However, in the present invention, the e-mail agent 320 may be implemented using a personal computer that allows the user of the personal computer to receive a new e-mail from the e-mail server 300 by performing a polling operation, and transmits the new e-mail to the e-mail client 340 that is preset by the user.

The message server 330 serves as a server that provides a Short Message Service (SMS) or a Multimedia Messaging System (MMS), and receives a mail notification message from the e-mail agent 320 that notifies the reception of the new e-mail from the e-mail agent 320, and transmits the mail notification message to the e-mail client 340.

When the e-mail client 340 receives the mail notification message notifying the reception of the new e-mail from the message server 330, the e-mail client 340 performs a communication connection with the e-mail agent 320 to receive the new e-mail from the e-mail agent 320.

In the e-mail system according to the present invention, the e-mail agent 320 transmits its Internet Protocol (IP) address, which is used for requesting the new e-mail, with the mail notification message notifying the new e-mail is received. Alternatively, the e-mail agent 320 registers its IP address in the message server 330 in advance, the e-mail client 340 checks if the IP address is registered when the e-mail client 340 receives the mail notification message, and if the IP address is not registered, the e-mail client 340 requests the message server 330 to send its IP address.

Figure 4:
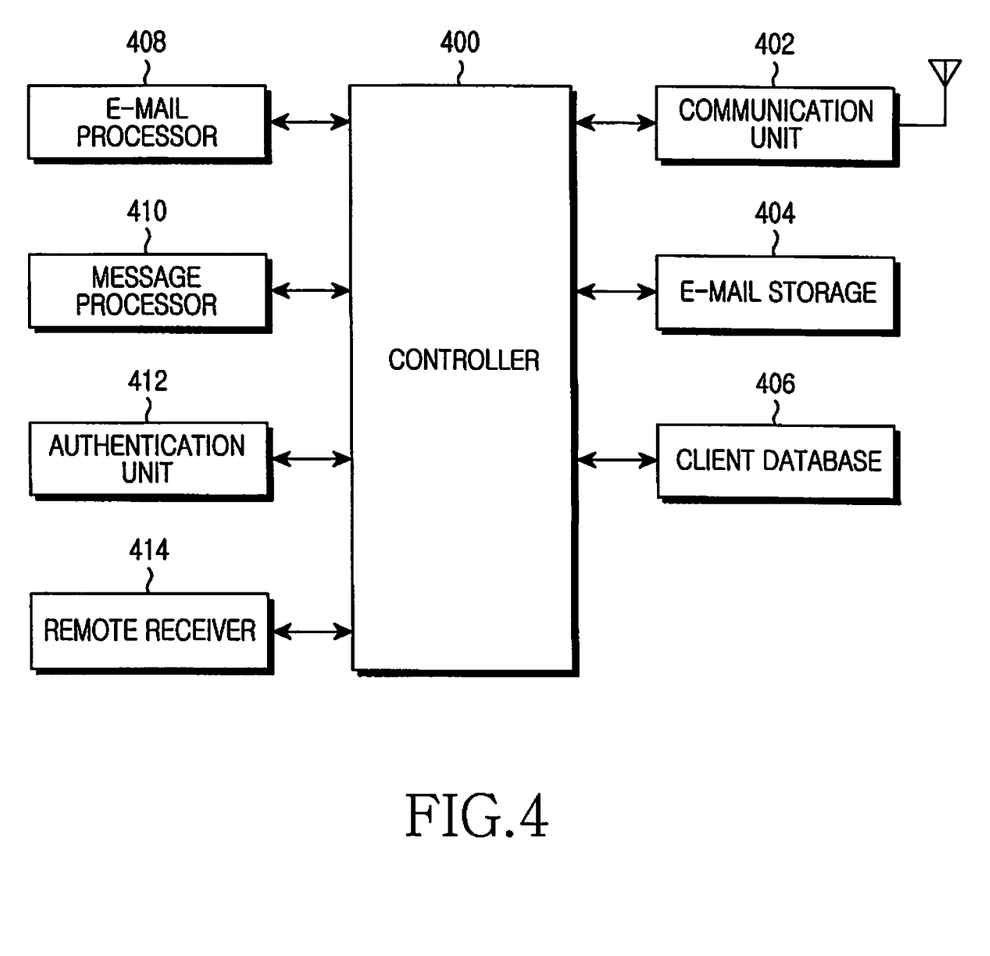
FIG. 4 is a block diagram of an e-mail agent in an e-mail system that notifies reception of an e-mail using a message server according to the present invention.

The e-mail agent 320 and the e-mail client 340 are described in detail with reference to FIGS. 4 and 5. FIG. 4 is a block diagram of an e-mail agent in an e-mail system that notifies reception of an e-mail using a message server according to an embodiment of the present invention. Referring to FIG. 4, a personal computer that is used as the e-mail agent includes a controller 400, a communication unit 402, an e-mail storage 404, a client database 406, an e-mail processor 408, a message processor 410, an authentication unit 412, and a remote receiver 414.

The communication unit 402 provides communication between the e-mail server 300 and the e-mail client 340. The e-mail storage 404 stores e-mails received from the e-mail server 300. When the client database 406 receives a new e-mail, for authenticating e-mail clients the client, database 406 stores authentication information and client information on one or more clients that receive the new e-mail. The client information may include information on a plurality of e-mail clients. That is, the new e-mail is sent to the plurality of e-mail clients.

The e-mail processor 408 periodically checks if a new e-mail exists in the e-mail server 300. When the new e-mail exists in the e-mail server 300, the e-mail processor 408 receives the new e-mail and stores the new e-mail into the e-mail storage 404. Also, when the e-mail processor 408 receives a mail request message from the e-mail client 340, the authentication unit 412 determines if the e-mail client 340 transmitting the mail request message is an authorized user. When the e-mail client 340 is an authorized user, the e-mail processor 408 transmits the new e-mail stored in the e-mail storage 404 to the e-mail client 340.

When the e-mail processor 408 receives the new e-mail, the message processor 410 generates a mail notification message including a current IP address of the e-mail agent 320 and information indicating the existence of the new e-mail, and transmits the mail notification message to the message server 330.

Although a personal computer having a mobile IP address as well as a personal computer having a fixed IP address can be used as the e-mail agent 320, the e-mail client 340 can use the above described e-mail service according to the present invention because the mail notification message includes the current IP address of the e-mail agent 320.

When the e-mail processor 408 receives the mail request message, the authentication unit 412 determines if the e-mail client 340 is an authorized user by comparing user identification information included in the mail request message with the authentication information stored in the client database 406.

Upon reception of a remote control message from the e-mail client 340, the remote receiver 414 for remotely controlling the e-mail agent 320 controls an operation corresponding to a control command included in the remote control message to be performed. An example of the control command is a turn on or a turn off command.

The controller 400 controls the e-mail processor 408, the message processor 410, and the authentication unit 412. The controller 400 can perform functions of the e-mail processor 408, the message processor 410, and the authentication unit 412. Herein, separate units are provided for the respective functions to explain the functions more clearly. However, in the real products, the controller 400 can be configured to perform all or some of the functions of the respective units.

Figure 5:
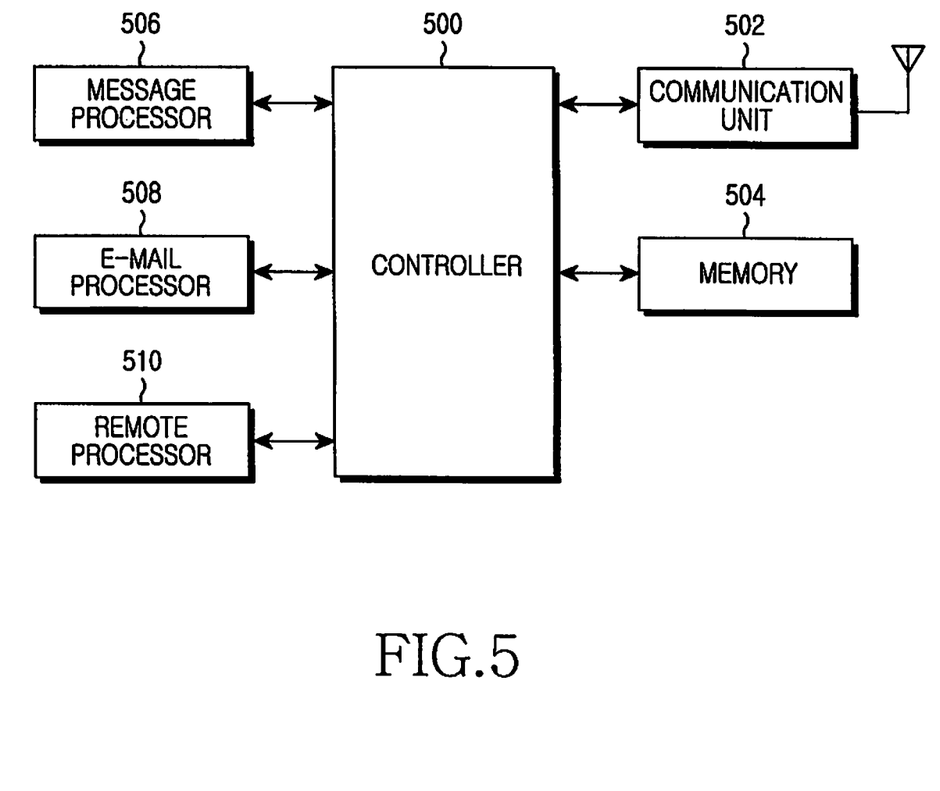
FIG. 5 is a block diagram of a portable terminal in an e-mail system that notifies reception of an e-mail using a message server according to the present invention.

FIG. 5 is a block diagram of a portable terminal in an e-mail system that notifies reception of an e-mail using a message server according to an embodiment of the present invention. Referring to FIG. 5, the portable terminal that is used as the e-mail client of the present invention includes a controller 500, a communication unit 502, a memory 504, a message processor 506, an e-mail processor 508, and a remote processor 510.

During a reception operation, the communication unit 502 down-converts an RF signal received through an antenna and despreads and channel-decodes the down-converted RF signal. During a transmission operation, the communication unit 502 channel-codes and spreads data, up-converts the data signal and transmits the up-converted signal through an antenna. The communication unit 502 receives a mail notification message from the message server 330 and communicates with the e-mail agent 320 to receive a new e-mail.

The memory 504 stores programs for controlling the overall operation of the portable terminal, application programs, and backup data (e.g., phone numbers, SMS messages, compressed image files, moving pictures, etc.). In addition, the memory 504 stores user identification information, received e-mails, and an IP address of the e-mail agent 320 included in the mail notification message according to the present invention.

Upon reception of the mail notification message from the message server 330, the message processor 506 stores an IP address of the e-mail agent 320 included in the mail notification message into the memory 504.

When the message processor 506 receives the mail notification message, the e-mail processor 508 performs communication connection with the e-mail agent 320 using the IP address included in the mail notification message. Then, the e-mail processor 508 generates a mail request message that requests a new e-mail and transmits it to the e-mail agent 320.

Upon reception of the new e-mail from the e-mail agent 320, the e-mail processor 508 stores the new e-mail into the memory 504. The mail request message includes user identification information stored in the memory 504 and information requesting the new e-mail.

When the e-mail processor 508 does not receive the new e-mail from the e-mail agent 320 for a predetermined period after transmitting the mail request message, it is assumed that the e-mail agent 320 is turned off, the e-mail processor 508 generates a remote control message requesting that the e-mail agent 320 be turned on and transmits the remote control message to the e-mail agent 320. Then, the e-mail processor 508 transmits the mail request message again.

The remote processor 510 generates a remote control message that includes a control command for remotely controlling the e-mail agent 320 and transmits it. An example of the control command is a turn on or a turn off.

The controller 500 controls the message processor 506, the e-mail processor 508, and the remote processor 510. The controller 500 can perform functions of the message processor 506, the e-mail processor 508, and the remote processor 510. Herein, separate units are provided for the respective functions to explain the functions more clearly. However, in the real products, the controller 500 can be configured to perform all or some of the functions of the respective units.

Figure 6:
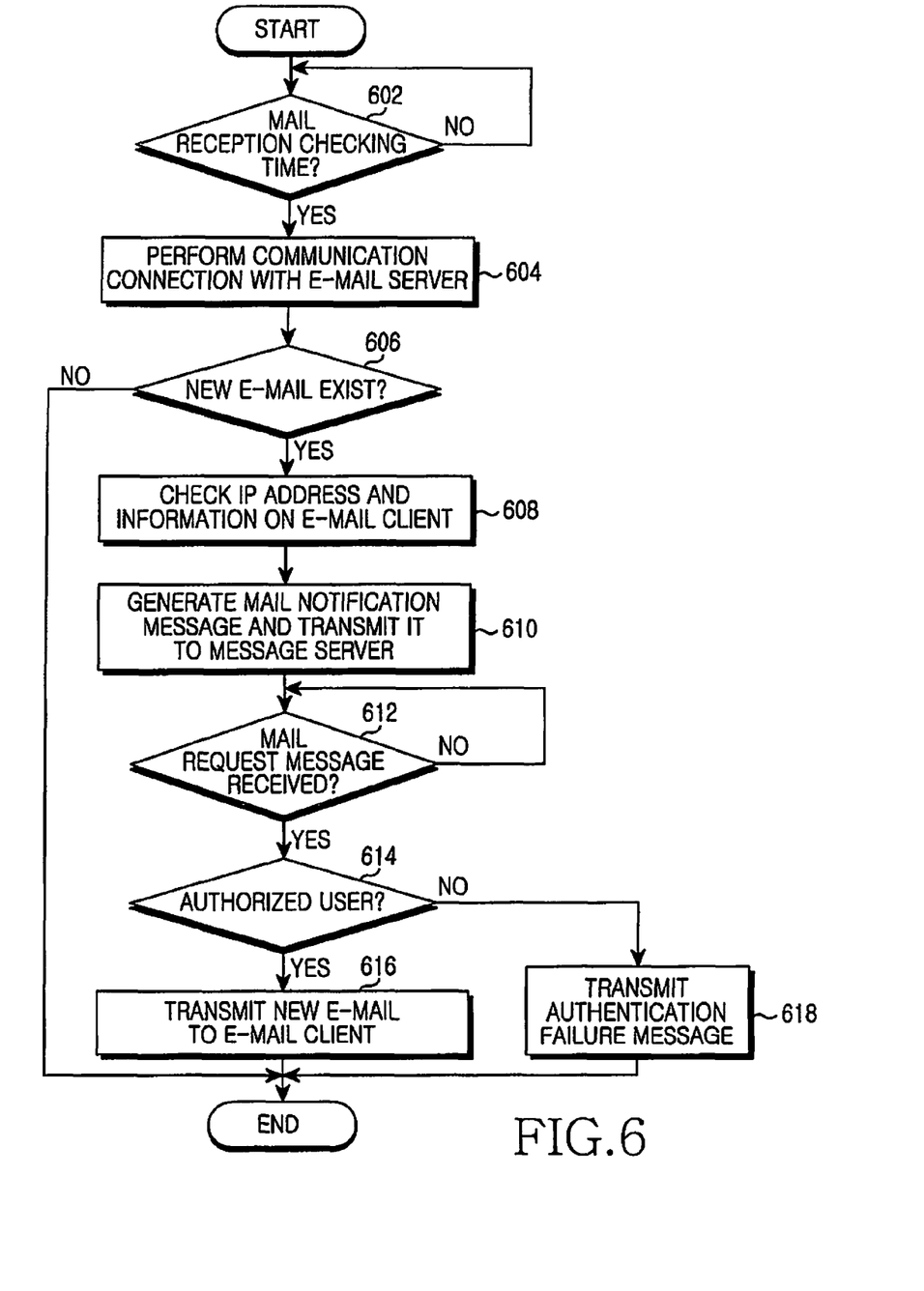
FIG. 6 is a flowchart illustrating a procedure for providing an e-mail service in an e-mail agent of an e-mail system according to the present invention.

Hereinafter, in an e-mail system according to the present invention, a method for pushing an e-mail to a portable terminal using a message server is described with reference to the accompanying drawings. FIG. 6 is a flowchart illustrating a procedure for providing an e-mail service in an e-mail agent of an e-mail system according to an embodiment of the present invention.

Referring to FIG. 6, the e-mail agent periodically determines in step 602 if it is now a preset mail reception checking time. When it is the preset mail reception checking time, in step 604, the e-mail agent performs a communication connection with an e-mail server, and in step 606, checks if a new e-mail exists in the e-mail server.

When a new e-mail exists in the e-mail server, in step 608, the e-mail agent detects its current IP address and information on an e-mail client that will receive the new e-mail. In step 610, the e-mail agent generates and transmits to the message server a mail notification message that includes the current IP address and information indicating the existence of the new e-mail in the e-mail server.

In step 612, the e-mail agent checks if a mail request message from the e-mail client is received. When the mail request message is received, in step 614, the e-mail agent checks if the mail request message originates from an authorized user by comparing user identification information included in the mail request message with authentication information stored in the e-mail agent. When the mail request message does not originate from an authorized user, in step 618, the e-mail agent transmits an authentication failure message to the e-mail client that sent the mail request message.

When the mail request message originates from an authorized user, in step 616, the e-mail agent transmits the new e-mail received from the e-mail server to the e-mail client.

Figure 7:
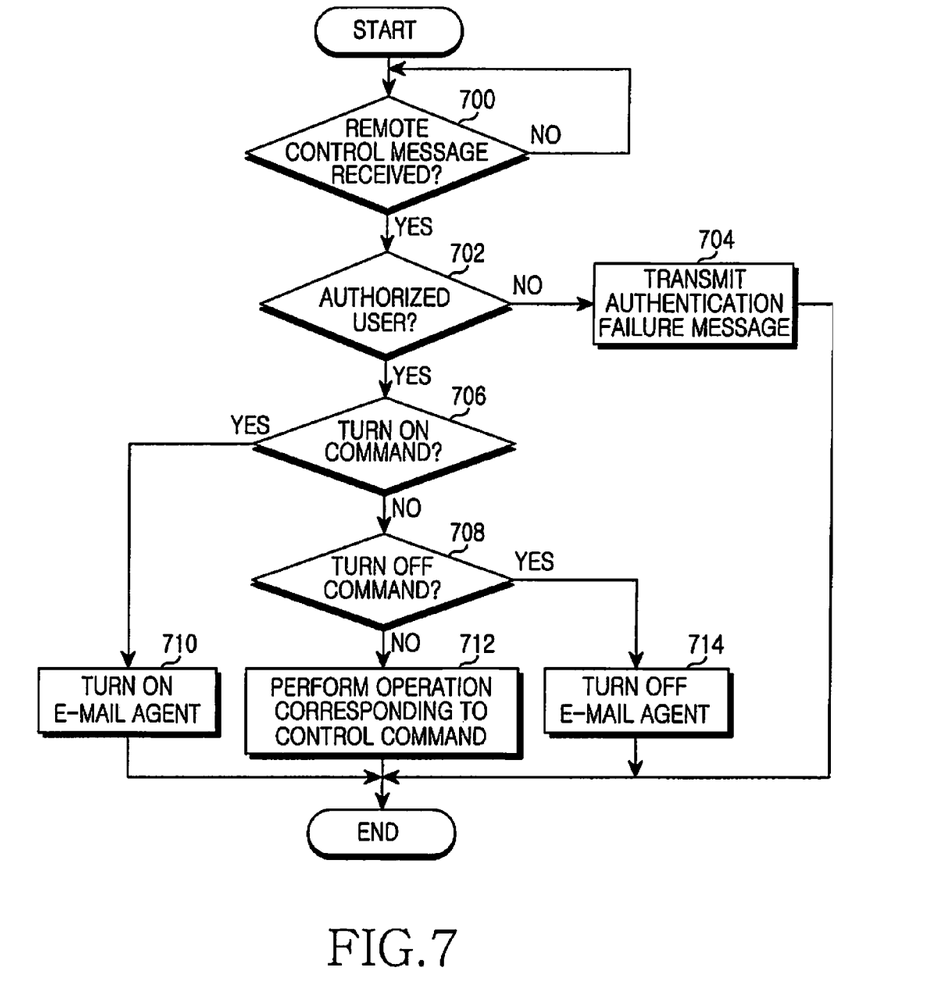
FIG. 7 is a flowchart illustrating a procedure for remotely controlling an e-mail agent of an e-mail system according to the present invention.

FIG. 7 is a flowchart illustrating a procedure for remotely controlling an e-mail agent of an e-mail system according to an embodiment of the present invention.

Referring to FIG. 7, the e-mail agent receives, in step 700, a remote control message from an e-mail client. In step 702, the e-mail agent determines if the e-mail client is an authorized user by using user identification information included in the remote control message. When the e-mail client is not an authorized user, in step 704, the e-mail agent transmits an authentication failure message to the e-mail client that sent the remote control message.

When the e-mail client is an authorized user, in step 706, the e-mail agent determines if a control command included in the remote control message is a turn-on control command requesting that the e-mail agent be turned on. When the control command is the turn-on control command, in step 710, the e-mail agent turns on from an off state.

When the control command is not the turn-on control command, in step 708, the e-mail agent determines if the control command is a turn-off control command requesting that the e-mail agent be turned off. When the control command of the remote control message is the turn-off control command, in step 714, the e-mail agent turns off from on stage.

When the remote control message does not include the turn-off control command as well as the turn-on control command, in step 712, the e-mail agent performs an operation corresponding to the control command of the remote control message.

Figure 8:
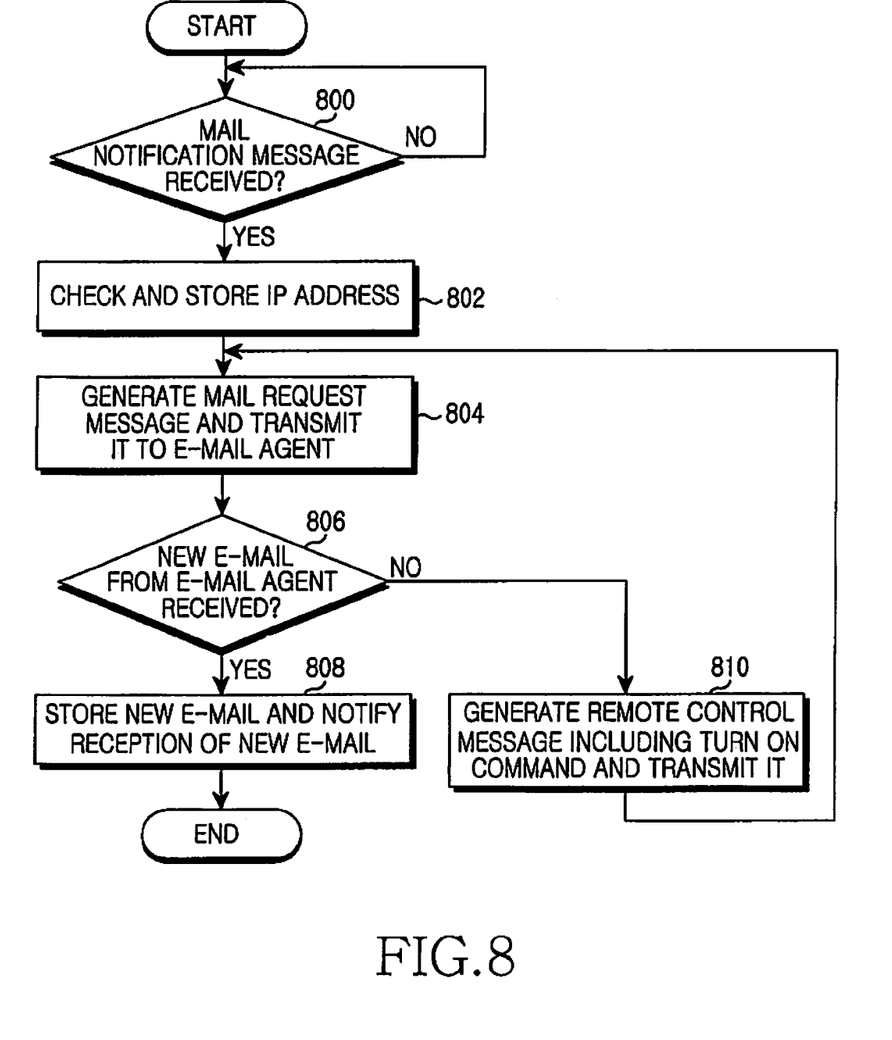
FIG. 8 is a flowchart illustrating a procedure for receiving an e-mail service in a portable terminal of an e-mail system according to the present invention.

FIG. 8 is a flowchart illustrating a procedure for receiving an e-mail service in a portable terminal of an e-mail system according to an embodiment of the present invention.

Referring to FIG. 8, the portable terminal used as an e-mail client according to the present invention receives a mail notification message from a message server in step 800. In step 802, the portable terminal checks and stores an IP address included in the mail notification message. In step 804, the portable terminal generates a mail request message requesting a new e-mail and transmits it to an e-mail agent having the IP address. The mail request message includes stored user identification information and information requesting the new e-mail.

In step 806, the portable terminal checks if the new e-mail from the e-mail agent is received. When the new e-mail is received, the portable terminal stores the new e-mail and notifies reception of the new e-mail to its user in step 808.

When the new e-mail is not received for a predetermined period after transmitting the mail request message in step 804, it is assumed that the e-mail agent is turned off. Then, the portable terminal generates a remote control message including a control command requesting that the e-mail agent be turned on, and transmits the remote control message to the e-mail agent in step 810. Thereafter, this procedure returns to the step 804 and then the portable terminal transmits the mail request message again.

As described above, the present invention provides an apparatus and method for notifying a portable terminal of reception of a new e-mail through the message server to allow the portable terminal to receive the new e-mail. The portable terminal checks if the new e-mail exists by checking the mail notification message from the message server, thereby reducing power consumption due to the conventional periodic polling operations or communication connection for receiving the new e-mail, and providing a push mail service to the portable terminal using a personal computer without a push mail server. In addition, a user does not need to input an IP address of a personal computer including the e-mail agent to the user's portable terminal, and the user can use the push mail service even though the IP address of the personal computer is frequently changing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An e-mail system for pushing an e-mail, the e-mail system comprising:

an e-mail agent for checking if a new e-mail exists in an e-mail server by using periodic polling operations, receiving and storing the new e-mail when the new e-mail exists in the e-mail server, generating a mail notification message notifying reception of the new e-mail, transmitting the mail notification message to a message server, receiving a mail request message from an e-mail client, and transmitting the new e-mail to the e-mail client, wherein the mail notification message includes a current Internet Protocol (IP) address of the e-mail agent which stores the received new e-mail and information indicating existence of the new e-mail in the e-mail agent;

the message server for receiving the mail notification message and transmitting the received mail notification message to the e-mail client; and the e-mail client for generating the mail request message requesting the new e-mail upon reception of the mail notification message from the message server, transmitting the generated mail request message to the e-mail agent corresponding to the current IP address included in the mail notification message, and receiving the new e-mail from the e-mail agent.

2. The e-mail system of claim 1, wherein the e-mail agent determines, upon reception of the mail request message from the e-mail client, if the e-mail client is an authorized user by using user identification information included in the mail request message, and transmits the received new e-mail to the e-mail client when the e-mail client is the authorized user.

3. The e-mail system of claim 1, wherein the e-mail agent performs the polling operation using a Simple Mail Transfer Protocol (SMTP), a Post Office Protocol version 3 (POP3), or an Internet Message Access Protocol version 4 (IMAP4).

4. The e-mail system of claim 1, wherein the message server provides a Short Message Service (SMS) or a Multimedia Messaging System (MMS).

5. The e-mail system of claim 1, wherein the e-mail client is a portable terminal that is capable of wireless communication.

6. The e-mail system of claim 1, wherein the e-mail agent is a personal computer.

7. An e-mail agent for pushing an e-mail through a message server in an e-mail system, the e-mail agent comprising:

an e-mail storage for storing an e-mail from an e-mail server;

a client database for storing information on an e-mail client;

an e-mail processor for periodically checking if a new e-mail exists in the e-mail server, receiving the new e-mail when the new e-mail exists in the e-mail server, and storing the received new e-mail into the e-mail storage; and a message processor for generating a mail notification message notifying that the new e-mail exists when the e-mail processor receives the new e-mail, and transmitting the mail notification message to the message server, wherein the mail notification message includes a current Internet Protocol (IP) address of the e-mail agent which stores the received new e-mail and information indicating existence of the new e-mail in the e-mail agent;

wherein the e-mail processor receives a mail request message from the e-mail client and transmits the new e-mail in the e-mail storage to the e-mail client, and wherein the e-mail client transmits the mail request message to the e-mail agent corresponding to the current IP address included in the mail notification message.

8. The e-mail agent of claim 7, wherein the e-mail processor checks if the new e-mail exists in the e-mail server by performing a polling operation using a Simple Mail Transfer Protocol (SMTP), a Post Office Protocol version 3 (POP3), or an Internet Message Access Protocol version 4 (IMAP4).

9. The e-mail agent of claim 7, wherein the client database stores authentication information for authenticating the e-mail client and comprises an authentication unit for determining if the e-mail client is an authorized user by comparing user identification information included in the mail request message with the authentication information stored in the client database, and the e-mail processor controls the authentication unit to determine if the e-mail client transmitting the mail request message is the authorized user upon reception of the mail request message from the e-mail client and transmits the new e-mail stored in the e-mail storage to the e-mail client when the e-mail client is the authorized user.

10. The e-mail agent of claim 9, wherein the mail request message includes the user identification information and information requesting the new e-mail.

11. The e-mail agent of claim 7, wherein upon reception of a remote control message from the e-mail client, the e-mail agent controls an operation, which corresponds to a control command included in the received remote control message, to be performed.

12. The e-mail agent of claim 11, wherein the remote control message includes user identification information and the control command.

13. The e-mail agent of claim 12, wherein the control command includes a turn on, a turn off, or a power saving mode activation command.

14. A portable terminal for checking reception of an e-mail using a message server in an e-mail system, the portable terminal comprising:
a message processor for receiving a mail notification message notifying of existence of a new e-mail from the message server, wherein the mail notification message includes a current Internet Protocol (IP) address of an e-mail agent which stores the received new e-mail and information indicating existence of the new e-mail in the e-mail agent; and
an e-mail processor for performing communication connection with the e-mail agent transmitting the mail notification message when the message processor receives the mail notification message, generating and transmitting a mail request message requesting the new e-mail to the e-mail agent corresponding to the current IP address included in the mail notification message, and receiving the new e-mail from the e-mail agent.

15. The portable terminal of claim 14, wherein the e-mail processor stores the received new e-mail.

16. The portable terminal of claim 14, wherein the mail request message includes user identification information and information requesting the new e-mail.

17. The portable terminal of claim 14, further comprising a remote processor for generating and transmitting a remote control message to control the e-mail agent remotely,
wherein the e-mail processor controls the remote processor to generate the remote control message including a control command requesting that the e-mail agent be turned on when the e-mail processor does not receive the new e-mail for a predetermined period after transmitting the mail request message, and transmits the remote control message to the e-mail agent.

18. The portable terminal of claim 17, wherein the remote control message includes user identification information and the control command.

19. The portable terminal of claim 18, wherein the control command is a turn on, a turn off, or a power saving mode activation command.

20. A method for pushing an e-mail using a message server in an e-mail agent of an e-mail system, the method comprising:
periodically checking if a new e-mail exists in an e-mail server;
generating a mail notification message notifying existence of the new e-mail and transmitting the mail notification message to the message server, wherein the mail notification message includes a current Internet Protocol (IP) address of the e-mail agent which stores the received new e-mail and information indicating existence of the new e-mail in the e-mail agent; and
receiving a mail request message from an e-mail client and transmitting the new e-mail to the e-mail client,
wherein the e-mail client transmits the mail request message to the e-mail agent corresponding to the current IP address included in the mail notification message.

21. The method of claim 20, further comprising:
determining, upon reception of the mail request message requesting the new e-mail from the e-mail client, if the mail request message is sent by an authorized user; and
transmitting the new e-mail to the e-mail client when the mail request message is sent by the authorized user.

22. The method of claim 21, wherein the mail request message includes user identification information and information requesting the new e-mail.

23. The method of claim 22, wherein determining if the e-mail client is an authorized user comprises determining if the e-mail client is the authorized user by comparing the user identification information included in the mail request message with authentication information pre-stored in the e-mail agent.

24. The method of claim 20, wherein periodically checking comprises checking if the new e-mail exists in the e-mail server by performing a polling operation using a Simple Mail Transfer Protocol (SMTP), a Post Office Protocol version 3 (POP3), or an Internet Message Access Protocol version 4 (IMAP4).

25. The method of claim 20, further comprising performing, upon reception of a remote control message, an operation corresponding to a control command included in the remote control message.

26. The method of claim 25, wherein the remote control message includes user identification information and the control command.

27. The method of claim 26, wherein the control command is a turn on, a turn off, or a power saving mode activation command.

28. A method for recognizing existence of a new e-mail through a message server and receiving the new e-mail in a portable terminal of an e-mail system, the method comprising:
receiving a mail notification message notifying existence of the new e-mail from the message server, wherein the mail notification message includes a current Internet Protocol (IP) address of an e-mail agent which stores the received new e-mail and information indicating existence of the new e-mail in the e-mail agent;
performing a communication connection with the e-mail agent transmitting the mail notification message;

generating and transmitting a mail request message requesting the new e-mail to the e-mail agent corresponding to the current IP address included in the mail notification message; and receiving the new e-mail from the e-mail agent.

29. The method of claim 28, further comprising storing the received new e-mail.

30. The method of claim 28, wherein performing the communication connection comprises performing a communication connection with the e-mail agent by using the current IP address of the e-mail agent included in the mail notification message.

31. The method of claim 28, wherein the mail request message includes user identification information and information requesting the new e-mail.

32. The method of claim 28, after transmitting the mail request message, further comprising:

generating, at a remote processor, a remote control message including a control command requesting that the e-mail agent be turned on when the new e-mail from the e-mail agent is not received for a predetermined period; and transmitting the generated remote control message to the e-mail agent.

33. The method of claim 32, wherein the remote control message includes user identification information and the control command.

34. The method of claim 33, wherein the control command is a turn on, a turn off, or a power saving mode activation command.

* * * * *